No. 784,332. PATENTED MAR. 7, 1905.
E. E. KNIGHT.
ADJUSTABLE HAY DIRECTOR FOR HAY LOADERS.
APPLICATION FILED AUG. 27, 1904.

Witnesses:
L. L. Heibrock.
L. H. Orwig.

Inventor: Eugene E. Knight,
By Thomas G. Orwig, Attorney.

No. 784,332. Patented March 7, 1905.

UNITED STATES PATENT OFFICE.

EUGENE E. KNIGHT, OF COLO, IOWA.

ADJUSTABLE HAY-DIRECTOR FOR HAY-LOADERS.

SPECIFICATION forming part of Letters Patent No. 784,332, dated March 7, 1905.

Application filed August 27, 1904. Serial No. 222,473.

*To all whom it may concern:*

Be it known that I, EUGENE E. KNIGHT, a citizen of the United States, residing at Colo, in the county of Story and State of Iowa, have invented a new and useful Adjustable Hay-Director for Hay-Loaders, of which the following is a specification.

My object is to provide means for conducting hay from an endless carrier in a hay-loader upon the wagon at different points of elevation as required to prevent hay from falling back to the ground from the top of the carrier when no conveyer or director intervenes between the top of the carrier and the wagon and the hay on the wagon.

A further object is to provide means for adjusting a hay-director in a frame as required at different points of elevation to serve as a bridge or inclined plane upon which hay will fall from the carrier and slide thereon and directed thereby to fall upon the top of the hay previously delivered upon the wagon.

My invention consists in the construction, arrangement, and combination of parts, as hereinafter set forth, pointed out in my claims, and illustrated in the accompanying drawings, in which—

Figure 1:
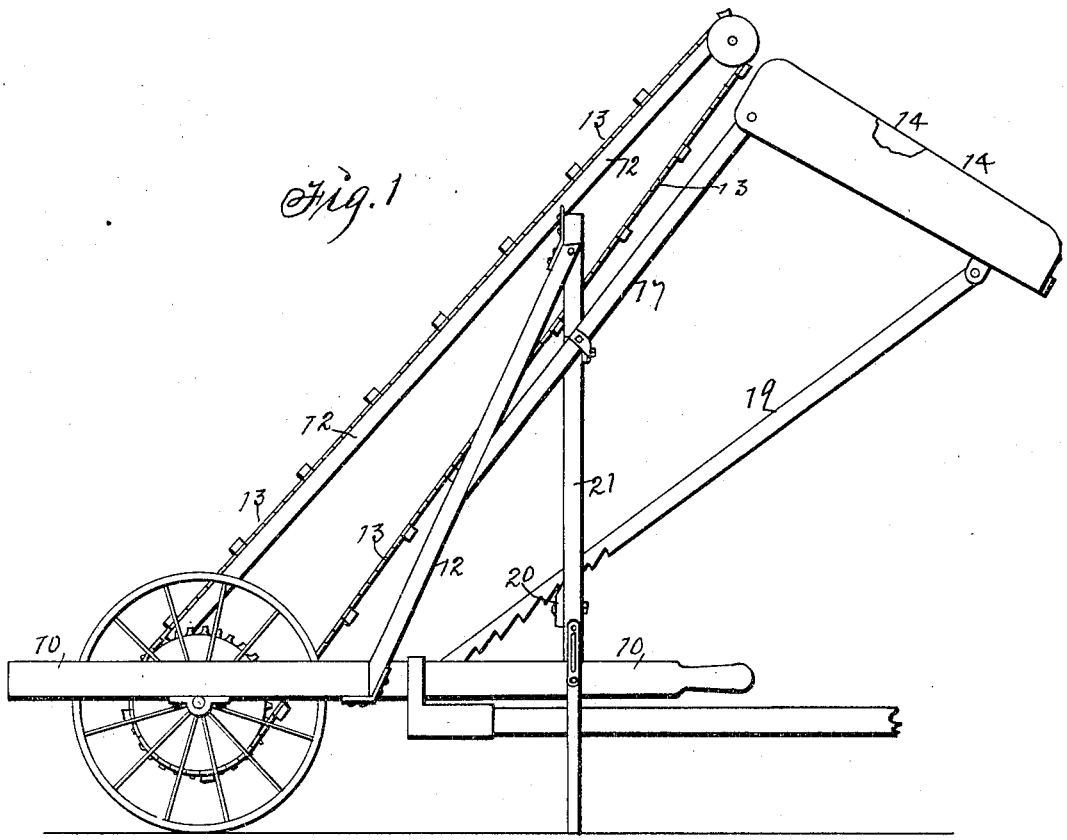
Figure 2:
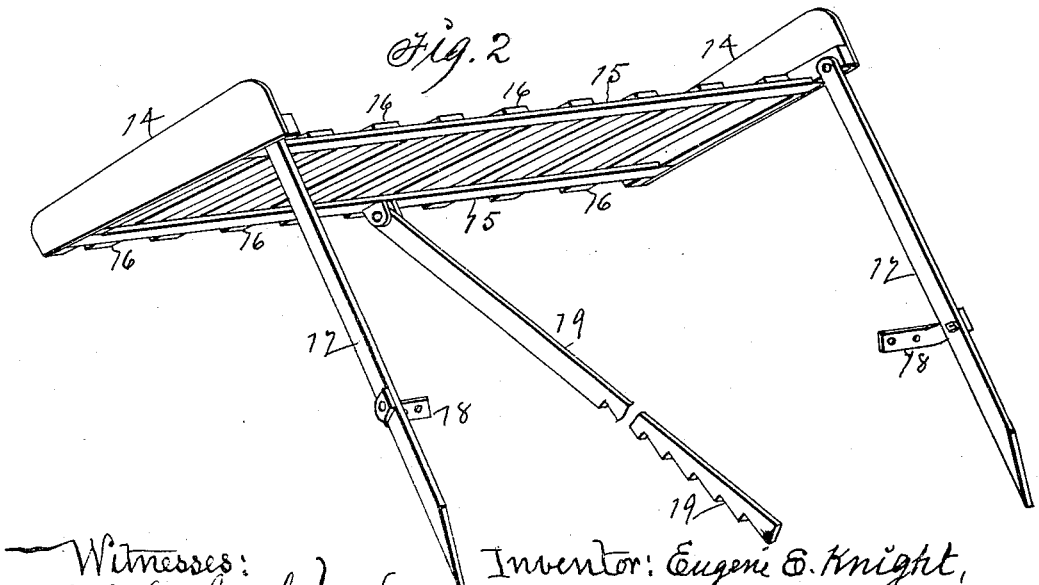

Figure 1 is a side view of the carriage and elevator-frame and endless carrier and shows my invention adjustably connected therewith, as required for practical use. Fig. 2 is an enlarged perspective view of the device ready to be connected to the frame of the hay-loader by means of supports pivotally connected therewith and parts of the complete device.

The numeral 10 designates the carriage-frame of a hay-loader mounted upon traction-wheels, and 12 is an elevator-frame fixed on top of the carriage-frame in an inclined position and common way, and 13 is an endless carrier upon the frame 12 and operatively connected therewith by sprocket-wheels and pulleys, as required for receiving and carrying hay up thereon to be delivered on a wagon.

The sides 14 of the device are connected by cross-pieces 15, rigidly fixed thereto, and a plurality of slats 16 are fixed on the cross-pieces, as shown in Fig. 2 or in any suitable way, to produce a support upon which hay may fall from the top of the endless carrier to be directed and delivered thereby on the top of hay on a wagon. The rear corners of the sides 14 are pivoted to the top ends of legs or supports 17, adapted to be fixed to the elevator-frame by means of angle-irons 18, as shown in Fig. 1, or in any suitable way. A bar 19 is pivotally connected with the center of the front cross-piece 15, and its lower end and lower side are notched and adapted to be adjustably connected with a cross-piece 20, fixed to parallel uprights 21, that are fixed to the carriage-frame and are parts of the elevator-frame.

In the practical use of my invention a person on a load of hay on a wagon can readily adjust the device as required to change its degree of angle relative to the endless carrier and the hay on the wagon by simply lifting the free end of the device, and thereby drawing the notched bar upward over the fixed cross-piece 20, and when he relaxes his hold the top edge of the cross-piece 20 will engage a lower notch and the bar 19 will serve as a prop to retain the device stationary and in proper position for conveying hay from the carrier to a higher position on the wagon.

Having thus set forth the purpose of my invention and its construction, application, and operation, the practical utility thereof will be obvious to farmers and others familiar with the art to which it pertains.

What I claim as new, and desire to secure by Letters Patent, is—

1. A device for directing and conveying hay from the endless carrier of a hay-loader consisting of a frame composed of parallel sides and cross-pieces fixed thereto, and slats fixed on the cross-piece, legs for supports pivotally connected with the rear ends of the parallel sides and a bar pivoted to the front and center of the front cross-pieces and provided with notches on its under side and lower end portion, to apply and operate in the manner set forth.

2. A device for directing and conveying hay from the endless carrier of a hay-loader consisting of a frame composed of parallel sides and cross-pieces fixed thereto and slats fixed on the cross-pieces, legs for supports pivotally connected with the rear ends of the parallel sides and a bar pivoted to the front and center of the front cross-pieces and provided with notches on its under side and lower end portion, in combination with an elevator-frame of a hay-loader having a fixed cross-piece to engage the notches of said pivoted bar and an endless carrier on the elevator-frame, to operate in the manner set forth.

EUGENE E. KNIGHT.

Witnesses:
M. O. MORELL,
CHAS. YEAGER.